United States Patent
Sun et al.

(10) Patent No.: US 8,370,121 B2
(45) Date of Patent: Feb. 5, 2013

(54) SEDIMENT TRANSPORT BY FULLY DEVELOPED TURBULENT FLOWS

(75) Inventors: Tao Sun, Missouri City, TX (US); Dachang Li, Katy, TX (US); David Hoyal, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 13/131,800

(22) PCT Filed: Nov. 16, 2009

(86) PCT No.: PCT/US2009/064512
§ 371 (c)(1),
(2), (4) Date: May 27, 2011

(87) PCT Pub. No.: WO2010/071721
PCT Pub. Date: Jun. 24, 2010

(65) Prior Publication Data
US 2011/0232913 A1    Sep. 29, 2011

Related U.S. Application Data

(60) Provisional application No. 61/138,895, filed on Dec. 18, 2008.

(51) Int. Cl.
*G06G 7/48* (2006.01)
(52) U.S. Cl. .......................................................... 703/9
(58) Field of Classification Search .................. 703/9
See application file for complete search history.

(56) References Cited

U.S. PATENT DOCUMENTS

| | | | |
|---|---|---|---|
| 6,549,854 | B1 | 4/2003 | Malinverno et al. |
| 7,062,383 | B2 | 6/2006 | Deffenbaugh et al. |
| 7,369,980 | B2 | 5/2008 | Deffenbaugh et al. |
| 2004/0122640 | A1 | 6/2004 | Dusterhoft |
| 2008/0255816 | A1 | 10/2008 | Neville |

FOREIGN PATENT DOCUMENTS

| WO | WO 2004/093521 | * 11/2004 |
|---|---|---|
| WO | WO 2006/036389 | * 4/2006 |

OTHER PUBLICATIONS

Garcia, Marcelo; Depositing and Eroding Sediment-Driven Flows, Turbidity Currents; PhD thesis, U Minnesota, UMI; pp. 1-257.*
Akiyama, J. et al. (1986), "Entrainment of Noncohesive Sediment Into Suspension, $3^{rd}$ Int. Symp. on River Sedimentation," Eds., Univ. of Mississippi, pp. 804-813.

(Continued)

*Primary Examiner* — Hugh Jones
(74) *Attorney, Agent, or Firm* — ExxonMobil Upstream Research Company Law Department

(57) ABSTRACT

The invention is a method of modeling a hydrocarbon reservoir. A parameter value in a set of equations is adjusted so that the output of the equations accurately matches observed sediment erosion and deposition behavior for sediment sizes throughout a range of about 10 microns to about 10 centimeters. An initial condition of a sediment bed in the hydrocarbon reservoir is defined. The equations are applied to the initial condition, wherein outputs of the equations express how a fluid flow affects erosion and deposition of sediments at the initial condition. The initial condition is adjusted based on the equation outputs to create a subsequent sediment bed condition. The equations are re-applied to the subsequent sediment bed condition a pre-determined number of times. The subsequent sediment bed condition is re-adjusted after each re-application of the equations. The model of the hydrocarbon reservoir is created and outputted.

21 Claims, 12 Drawing Sheets

OTHER PUBLICATIONS

Choux, C.M.A. et al. (2005), "Comparison of Spatio-Temporal Evolution of Experimental Particulate Gravity Flows At Two Different Initial Concentrations, Based on Velocity, Grain Size and Density Data," *Sedimentary Geology* 179, pp. 49-69.

Garcia, M. H. (1993), "Depositional Turbidity Currents Laden With Poorly Sorted Sediment," *Journal of Hydraulic Engineering* 120(11), pp. 1240-1263.

Garcia, M. et al. (1991), "Entrainment of Bed Sediment Into Suspension," *Journal of Hydraulic Engineering* 117(4), pp. 414-435.

Garcia M.H. (1999), "Sedimentation and Erosion Hydraulics," Chapter 6, Hydraulic Design Handbook, McGraw-Hill Book Co., pp. 6.1-6.33.

Garcia, M. et al. (1993), "Experiments on the Entrainment of Sediment Into Suspension by a Dense Bottom Current," *Journal of Geophysical Research* 98(C3), pp. 4793-4807.

Mahieux, G. et al. (2000), "Dynamic Modeling of Turbidite Erosion, Transport and Deposition in Three Dimensions," *Earth And Planetary Sciences* 331, pp. 345-351.

Parker, G., et al. (1986), Self-Accelerating Turbidity Currents, *J Fluid Mech.* 171, pp. 145-181.

Sun, Tao, et al., (Aug. 2001) "A Computer Model for Meandering Rivers With Multiple Bed Load Sediment Sizes, 1. Theory", Water Resources Research, vol. 37, No. 8, pp. 2227-2241.

Sun, Tao, et al. (Aug. 2001) A Computer Model for Meandering Rivers With Multiple Bed Load Sediment Sizes, 2. Computer Simulations, Water Resources Research, vol. 37, No. 8, pp. 2243-2258.

\* cited by examiner

SEDIMENT TRANSPORT BY FULLY DEVELOPED TURBULENT FLOWS

CROSS-REFERENCE TO RELATED APPLICATION

This application is the National Stacie of International Application No. PCT/US2009/064512, that published as WO2010/071721, filed 24 Jun. 2010 which claims the benefit of U.S. Provisional Application No. 61/138,895, filed 18 Dec. 2008. The entirety of each of these applications is incorporated herein by reference for all purposes.

FIELD OF THE INVENTION

The invention relates generally to any field where the transport of sediments by fully developed turbulent flows is concerned, such as civil and environmental engineering, coastal and marine engineering, and oil and gas industries. Specifically, the invention relates to methods for analyzing erosion, transport, and deposition of sediments by fully developed turbulent flows.

BACKGROUND OF THE INVENTION

This section is intended to introduce various aspects of the art, which may be associated with embodiments of the invention. A list of references is provided at the end of this section and will be referred to hereinafter. This discussion, including the references, is believed to assist in providing a framework to facilitate a better understanding of particular aspects of the invention. Accordingly, this section should be read in this light, and not necessarily as admissions of prior art.

Computer models of erosion, transport and deposition of sediments by both water flow and turbidity current are important tools in a wide array of environmental, engineering and energy industries. These models are needed for designing bridge piers, dredging channels and harbors, and protecting beaches and wetlands. Recently, these models have also been applied to build geologic models for exploration, development and production of energy sources in oil and gas industries.

A geologic model is a digital representation of the detailed internal geometry and rock properties of a subsurface earth volume, such as a petroleum reservoir or a sediment-filled basin. In the oil and gas industry, geologic models provide geologic input to reservoir performance simulations which are used to select locations for new wells, estimate hydrocarbon reserves, and plan reservoir-development strategies. The spatial distribution of permeability is a key parameter in characterizing reservoir performances, and, together with other rock and fluid properties, determines the producibility of the reservoir.

The spatial distributions of permeability in most oil and gas reservoirs are highly heterogeneous. One of the principal causes of the heterogeneity is the distribution of different grain sizes of sediments in different places in the reservoir. This is because most clastic reservoirs were formed by the deposition of the sediments in ancient fluvial, deltaic and deep water depositional systems. Since sediment grains with different sizes are eroded and transported differently, they are then been deposited in different places in the reservoir. Therefore if erosion, transport and deposition of the sediments can be accurately modeled in depositional systems, the heterogeneities of reservoirs formed by these depositional processes can also be accurately captured.

Two steps used to develop a model for sediment erosion, transport and deposition are 1) establishing a re-suspension (also known as erosion or entrainment) relationship between different size sediment grains and flows of different strength, and 2) characterizing the distribution of the suspended sediments in the vertical direction of the water column in which the sediments are suspended. In a single or multiple layer depth averaged flow model, the vertical distribution of the suspended sediments is described by the relationship that relates the near bed sediment concentration to the depth average concentration for different sizes of the grains. The second step is important because the deposition of the suspended sediments from the flow to the bed is closely related to the concentration of the sediments suspended just above the bed. In single or multiple layer depth averaged flow models, only the layer averaged values of the sediment concentration can be computed. These layer averaged concentration values can be significantly different from the actual concentration values that are just above the bed. Therefore the relationship that relates the depth averaged concentration to the near bed concentration is a necessary step for accurate calculations of the deposition of the sediments and subsequently, modeling of the sediment transport.

The most commonly used re-suspension (erosion) relationship is known as the Garcia-Parker re-suspension function. In this function, the rate of re-suspension of sediments of grain size bin i into the flow from the bed is $$E_i = E_{s_i} v_{si} G_i \qquad [1]$$
$$= \frac{a_z Z_i^5}{1 + \frac{a_z}{e_m} Z_i^5} v_{si} G_i$$

where $E_{si}$ is the dimensionless re-suspension rate and is related to the dimensional re-suspension rate by $$E_{si} = \frac{E_i}{v_{si} G_i} = \frac{a_z Z_i^5}{1 + \frac{a_z}{e_m} Z_i^5}. \qquad [2]$$

In Equation [1], $G_i$ is the volumetric percentage of the sediments of grain size bin i in the surface layer, $v_{si}$ is the settling velocity for a sediment grain with diameter $D_i$ in the i th size bin, $a_z$ is a constant and typically has a value of $1.3 \times 10^{-7}$, and $e_m$ equals the maximum value of the dimensionless re-suspension rate $E_{si}$. The value of $e_m$ sets the upper limit on the value of the re-suspension function.

Function $Z_i$ shown in Equation [1] is defined as $$Z_i = \lambda \frac{u^*}{v_{si}} f(R_{pi}) \left(\frac{D_i}{D_{50}}\right)^{0.2} \qquad [3]$$

in which $$\lambda = 1 - 0.288 \sigma_\phi. \qquad [4]$$

In the above equations, $u^*$ is the shear flow velocity, $D_{50}$ is the diameter of the sediment grain in the 50th percentile in the distribution, and $\sigma_\phi$ is the standard deviation of the grain size distribution in the logarithmic "phi" units familiar to geologists. The particle Reynolds number $R_{pi}$ for grains in the $i^{th}$ size bin is defined as $$R_{pi} = \frac{(RgD_i)^{1/2}D_i}{v} \quad [5]$$

where R is the submerged specific weight of the sediments, g is the gravitational acceleration constant, and v is the kinematic viscosity of the water.

There are two commonly used formulations of the Reynolds function $f(R_{pi})$ as used in Equation [3]. The first is $$f(R_{pi}) = R_{pi}^{0.6}. \quad [6]$$

The second form of the Reynolds function adds a correction for particles with a small particle Reynolds number as follows:

$$f(R_{pi}) = \begin{cases} R_{pi}^{0.6} & \text{if } R_{pi} > 2.36 \\ 0.586 R_{pi}^{1.23} & \text{if } R_{pi} \leq 2.36. \end{cases} \quad [7]$$

Both forms of $f(R_{pi})$ are in use. In this document, the re-suspension relationship defined by Equations [1], [3] and using the form of $f(R_{pi})$ in Equation [6], is referred to as the Garcia Thesis Model. Correspondingly, the re-suspension relationship using the form of $f(R_{pi})$ in Equation [7] is referred to as Garcia 1993 Model.

For sediments with a single grain size, the re-suspension relationship [3] shown above can be simplified because the terms λ and $$\left(\frac{D_i}{D_{50}}\right)^{0.2},$$

both characterizing interactions among sediment particles of different grain sizes, are both reduced to 1. The function $Z_i$ can therefore be stated as $$Z_i = \frac{u^*}{v_{si}} f(R_{pi}). \quad [8]$$

The re-suspension relationship using Equation [8] is often used to study flume experiments.

Another example of a re-suspension function that could be used is from Akiyama and Fukushima. In this re-suspension function, the rate of re-suspension of sediments of the grain size bin i into the flow is:

$$E_i = \begin{cases} 0.3 v_{si} G_i, & Z_i > Z_m \\ 3 \times 10^{-12} Z_i^{10} \left(1 - \frac{Z_c}{Z_i}\right) v_{si} G_i, & Z_c \leq Z_i \leq Z_m \\ 0, & Z_i < Z_c \end{cases} \quad [9]$$

where $Z_c=5$ and $Z_m=13.2$. The calculation of $Z_i$ is the same as that shown in Equations [3] or [8].

The re-suspension relationships shown in Equations [1] and [9] are necessary closure relationships in the calculations of transport of sediments in natural conditions, using any flow models. Examples of these flow models include depth-averaged flow models, full 2D flow models, and full 3D flow models. Here the full 2D and 3D flow models refer to models where the variations of the flow properties and sediment concentrations in the vertical direction are variables of the governing flow equations. Many flow models used in existing commercial software such as Fluent or Flow3D are of this class.

Another important closure relationship that is necessary when the depth-averaged flow models are used is the relationship between $r_0$ (which represents the ratio of the near-bed depth to the depth averaged sediment concentrations) and the flow and sediment conditions. When sediment is transported by turbulent flow, the distribution of the sediments in the vertical direction is not uniform, but instead certain sediment concentration profiles are formed. Usually the concentration of the sediments is greater in the bottom part of the flow (i.e., nearest the bed) than in the upper part of the flow. Near-bed sediment concentrations refers to the sediment concentrations at the place that is right above the bed. The actual location is often treated as a model parameter. Typical values range from a distance equal to the diameter of the largest grain on the bed, to 10% of the flow depth.

The most commonly used expression for $r_0$ is the constant approximation where $$r_0 = \text{const} \quad [10]$$

in which the constant typically has a value range between 1.0 to 2.5. Another expression of $r_0$ is $$r_0 = 1 + 31.5 \mu^{-1.46} \quad [11]$$

in which $$\mu = \frac{u^*}{v_s} \quad [12]$$

is the ratio between the shear velocity u* and the particle fall velocity $v_s$. In a mixture of sediments with multiple size particles, $r_{0i}$ can be substituted in the above equations for $r_0$, and $v_{si}$ for $v_s$, corresponding to sediment grains in the size bin i, respectively. Other expressions of $r_0$ include a linear form $$r_0 = 2.0761 - 0.0108 \mu \quad [13]$$

and a simple power law form $$r_0 = 2.2461 \mu^{-0.0772}. \quad [14]$$

Similar to Equations [10] and [11], $r_{0i}$ is substituted for $r_0$ and $v_{si}$ for $v_s$ for sediment mixtures of multiple size particles.

Both the re-suspension functions and the near bed to depth averaged sediment concentration relationships shown in Equations [1], [9], [10], [11], [13] and [14] were mostly obtained from flume experiments using sediment mixtures with very fine mean grain sizes and with narrow grain size distributions. While these equations are suitable in such circumstances, important deficiencies and significant inconsistencies are observed in all of the equations when applied in certain real-world conditions. These deficiencies and inconsistencies will now be discussed in more detail.

Since the dimensionless entrainment rate $E_{si}$ shown in Equation [2] is a monotonic function of $Z_i$, a threshold value $Z_t$ can then be chosen to define the onset of significant suspension. According to Equation [3] or [8], $Z_i$ is a function of the shear flow velocity u* and the grain size $D_i$. Therefore curves $Z_i(u^*,D_i)=Z_t$ can be drawn in a u*-D plot to indicate the location of the onset of the significant suspension in u*-D space for any choice of $Z_t$.

FIG. 1A shows plots 11, 12 and 13 of the curves $Z_i(u^*,D_i) = Z_t$ obtained using the Garcia Thesis Model and corresponding to three different choices of $Z_t$, namely 1, 5 and 10, respectively. FIG. 1B shows curves 21, 22 and 23 obtained using the Garcia 1993 Model and corresponding to the same values of $Z_t$. For comparison, the Shields curve 14, which describes the critical shear velocity needed for the beginning of motion of particles of size $D_i$ on the bed, has also been plotted in FIGS. 1A and 1B. The Shields curve was developed from flume experiments and is used in many bedload transport relationships. For further comparison, the curve 15 of $u^* = v_s(D_i)$ has also been plotted in FIGS. 1A and 1B. Curve 15 shows when the shear velocity has the same value as the falling velocity of the particle of the size $D_i$. In most situations, significant suspension can not occur when the shear flow velocity $u^* < v_s(D_i)$. Therefore, this curve provides a good lower bound for the beginning of suspension.

As expected, FIGS. 1A and 1B show that the curves plotted with different values of $Z_t=1$, $Z_t=5$ and $Z_t=10$, are different. Larger values of $Z_t$ imply a higher threshold for the onset of suspension, and consequently, correspond to higher threshold values of $u^*$ for the same D. A commonly used value is $Z_t=5$.

It can be seen immediately from FIGS. 1A and 1B that results for the onset of significant suspension obtained using both the Garcia Thesis Model and the Garcia 1993 Model are incorrect for sediments of grain sizes greater than about 1.5 mm. Specifically, the curves predict that shear flow velocity $u^*$ will decrease as grain sizes D increase above about 1.5 mm. This is contrary to common knowledge that larger particles are heavier and more difficult to move, and thus are less likely to be suspended than lighter particles. The results shown in FIG. 1A, however, incorrectly suggest that a larger flow velocity is required to suspend a particle with diameter 1.5 mm than to suspend a particle with diameter of 100 mm.

A second inconsistency of previous re-suspension models is that the curves for the onset of significant suspension plotted in FIGS. 1A and 1B drop far below the $u^*=v_s$ curve and the Shields curve for large grain size sediments. It has been observed that most natural rivers characterized by a dominating suspended sediment load are plotted above the $u^*=v_s$ curve. The natural rivers that are plotted between the $u^*=v_s$ curve and the Shields curve are mostly bed load dominated, and the suspension of sediments therein is not significant. As curves 11-13 and 21-23 fall even below the Shields curve for large grain size sediments, the re-suspension models used to generate curves 11-13 and 21-23 do not accurately predict behavior of large grain size sediments.

The same inconsistency becomes clearer when the curves for the onset of significant suspension are used to predict the shear flow velocity $u^*$ for sediments with grain sizes greater than, for example, 4 mm, if the $Z_t=5$ curve 12, 22 is used as the criteria. In this case, the $Z_t=5$ curve 12, 22 drops below the Shields curve 14 for all the sediments having D>4 mm, which implies that a significant amount of suspension can occur at a value of $u^*$ that is smaller than the critical value of $u^*$ for any bed load to occur. Once again, the known functions relating to the onset of significant suspension, as plotted in FIGS. 1A and 1B, are clearly incorrect.

The curves for the onset of significant suspension corresponding to the Garcia 1993 Model (FIG. 1B) differ from that of the Garcia Thesis Model (FIG. 1A) in that a correction for sediment particles with small particle Reynolds numbers has been added. This correction mitigates the error in the Garcia Thesis Model where the curves for suspension onset drop below the Shields curve for very fine sediments. For example, the curve 12 corresponding to $Z=5$ in FIG. 1A drops below the Shields curve 14 when the sediment grain size is less than about 0.05 mm. Although the corresponding $Z=5$ curve 22 in FIG. 1B also drops below the Shields curve 14 for very small sediment grain size, such crossover occurs when the grain size decreases to less than about 0.008 mm. Therefore, despite the improvement the Garcia 1993 Model made with regard to the original Garcia Thesis Model, the segment of each curve that corresponds to small particles is still convex, as is the case with FIG. 1A. This convexity of the curves is also manifest in the portions of the curves corresponding to large particles. The convex nature of the curves predicts an increasing better sorting of the sediments with decreasing mean grain sizes of D<0.07 mm, which is inconsistent with field observations. In this context, sorting refers to how a fluid flow deposits sediments. It is assumed that larger, heavier sediments are deposited before smaller, lighter sediments.

The convex nature of the small particle Reynolds number segment of curves 11-13, 21-23 also results in near zero slope in these curves for sediments with grain sizes from 0.02 mm to 0.07 mm. This implies that for sediments of single grain sizes in this grain size range, the re-suspension rates of the sediments does not significantly vary. Under such conditions, however, the Garcia 1993 Model could predict a reversed sorting (i.e., the fluid flow deposits smaller sediments before larger sediments) if the terms for the interactions among sediments of different grain sizes shown in Equation [3] are also taken into account. In FIG. 2, the dimensionless sediment re-suspension rate $E_S$ is plotted as a function of the shear flow velocity for different grain sizes in the mixture as follows: a grain size of 6.25 microns is shown by the lighter solid line 25, a grain size of 12.5 microns is shown by the dotted line 26, a grain size of 25 microns is shown by the dashed line 27, a grain size of 50 microns is shown by the darker solid line 28, a grain size of 100 microns is shown by the plotted circles 29, a grain size of 200 microns is shown by the plotted squares 30, a grain size of 400 microns is shown by the plotted+signs 31, and a grain size of 800 microns is shown by the plotted triangles 32. Equations [3] and [7] (i.e., the Garcia 1993 Model) are used to obtain the results shown in the Figure. It is clear from FIG. 2 that the dimensionless re-suspension rate $E_S$ decreases as the sediment grain size increases, except when the grain size is 50 microns. Contrary to what would be expected, the dimensionless re-suspension rate for sediments with grain size of 50 microns is greater than the re-suspension rate for sediments with smaller grain sizes of 25 microns and 12.5 microns. The results predicted by the Garcia 1993 Model are therefore incorrect.

Similar to the inconsistencies of the existing re-suspension functions as outlined above, the known functions expressing the ratio between the near-bed sediment concentrations and the depth averaged values also have many significant deficiencies. FIG. 3 shows the ratio $r_0$ between the near-bed sediment concentration and the depth averaged concentration, as a function of $\mu$, where $$\mu = \frac{u^*}{v_s}.$$

Two sets of experimental data, identified in the Figure as the Garcia data set 34 (diamonds) and the Graf data set 35 (circles), are plotted in the Figure. Also shown in the Figure are various approximations for $r_0$, such as a constant approximation 36 as suggested by Equation [10], a simple linear fit 37 as suggested by Equation [13], a simple power law approximation 38 as suggested by Equation [14], and an approximation 39 as calculated from Equations [11] and [12]. The values for $r_0$ according to curves 36, 37 and 38 are not good fits for the experimental data 34, 35, especially for small values of $\mu$ (i.e., less than 10). For example, when $\mu \to 0$, the value of $r_0$ is about 2.1 and 3.1 according to the simple linear fit 37 and the simple power law approximation, respectively. Note that $\mu \to 0$ corresponds to situations when there is little turbulence in the flow and sediments get little lift to stay suspended in the flow. In these situations, most of the sediments will be concentrated in the very bottom part of the flow. The value of $r_0$ is therefore expected to be significantly greater than the numbers predicted by these two approximations.

The approximation 39 appears to be a somewhat better fit to the experimental data 34, 35 but is still seriously deficient for very small values of $\mu$. Specifically, in the approximation 39 $r_0 \to \infty$ when $\mu \to 0$. This is not correct. Let $C_b$ be the near-bed sediment concentration and C be the depth averaged sediment concentration. The near-bed sediment concentration $C_b$ is defined as the sediment concentration measured at the distance from the bed equal to certain fraction $\delta$ of the flow height. In the limiting case when all the sediments are below the level of $\delta h$, where h is the flow height, $C_b \delta h < Ch$. Therefore $$r_0 = \frac{C_b}{C} < \frac{1}{\delta}.$$

In practice, a value of 0.05 is often used for $\delta$. In that case, the upper bound for $r_0$ is 20.

The re-suspension relationship defined in Equations [1] and [3] is a continuous function with regard to u*. When this form of re-suspension relationship is used together with bed load transport equations, which often contain cut-off thresholds based on critical shear stresses, inconsistencies could arise. FIG. 4 shows the comparison of the volumetric transport per unit width q between the bed load transport, represented by curve 40 and the suspended load transport, represented by curve 41. The bed load transport relationship used in the calculation is taken from the Ashida reference cited herein. The suspended load is calculated using the Garcia 1993 Model given in Equations [1], [3], [4], [5] and [7]. The calculation used twelve bins of sediments with a minimum grain size of 6.25 micron and a maximum grain size of 1.280 cm and assumed a log-uniform distribution. The results shown in FIG. 4 correspond to the sediments with a grain size of 1.6 mm. For shear flow velocity u*>0.35, FIG. 4 shows that the sediment transport was initially dominated by the bed load. As u* increases, the suspended load becomes the main component of the sediment transport, as expected. It can also be seen from the figure that for u*<0.29, the bed load drops to zero because the critical shear flow velocity is not exceeded. However, different from the bed load, since $E_s$ is a continuous function of u*, the suspended load is not zero. Although the rate of the suspended load transport must also be small, the results of FIG. 4 nonetheless imply the suspension of 1.6 mm size sediments prior to the occurring of any bed load transport, which cannot be correct.

Many problems and inconsistencies with existing theories of re-suspension of sediments in turbulent flows have been set forth herein. A model that eliminates these problems and inconsistencies is needed. The present invention provides such a model.

Other related material may be found in the following: U.S. Pat. No. 70,201,300; Akiyama, J., and Fukushima, Y. (1986), Entrainment of noncohesive sediment into suspension, 3$^{rd}$ Int. Symp. on River sedimentation, S. Y. Wang, H. W. Shen and L. Z. Ding, eds., Univ. of Mississippi, 804-813; Garcia, Ph.D thesis, University of Minnesota, 1989 [Inventors: need full cite here]; Garcia and Parker, Entrainment of bed sediment into suspension, Journal of Hydraulic Engineering, 117 (4), pp 414-435, 1991; Garcia and Parker, Experiments on the entrainment of sediment into suspension by a dense bottom current, Journal of Geophysical Research, 98(C3), 4793-4807, 1993; Garcia, M. H. (1999), Sedimentation and erosion hydraulics, Hydraulic design handbook, L. Mays, ed., McGraw-Hill, New York, 6.1-6.113; Graf, W. H., (1971), Hydraulics of sediment transport. McGraw-Hill Book Co., Inc., New York, N.Y. [Inventors: need page numbers here.]; Parker, G., Fukushima, Y., and Pantin, H. M. (1986), Self-accelerating turbidity currents, J. Fluid Mech., v 171, 145-181; Ashida, K. and Michiue, M. (1971), An investigation of river bed degradation downstream of a dam, Proc. 14$^{th}$ Congress of the IAHR. [inventors: need full cite]; and Garcia, M. H., Depositional turbidity currents laden with poorly sorted sediment, Journal of Hydraulic Engineering, v 120, No. 11, pp 1240, (1993).

SUMMARY OF THE INVENTION

In one embodiment, the invention is a method of modeling a hydrocarbon reservoir. Data is evaluated representing observed sediment erosion and deposition behavior. A parameter value in a set of equations is adjusted so that the output of the set of equations accurately matches the observed sediment erosion and deposition behavior for sediment sizes throughout a range of about 10 microns to about 10 centimeters. A grain size distribution of an initial condition of a sediment bed in the hydrocarbon reservoir is defined. The set of equations with the adjusted parameter value is applied to the initial condition of the sediment bed. Outputs of the set of equations express how a fluid flow affects the erosion and deposition of sediments at the initial condition of the sediment bed. The grain size distribution of the initial condition of the sediment bed is adjusted based on the outputs of the set of equations, to create a subsequent sediment bed condition having a grain size distribution associated therewith. The set of equations with the adjusted parameter value is re-applied to the subsequent sediment bed condition a pre-determined number of times. The grain size distribution of the subsequent sediment bed condition is re-adjusted after each re-application of the set of equations with the adjusted parameter value. The model of the hydrocarbon reservoir is created using the subsequent sediment bed condition. The model of the hydrocarbon reservoir is outputted.

In another embodiment, the invention is a method of extracting hydrocarbons from a hydrocarbon reservoir. A set of equations relating to sediment erosion and deposition is defined. At least one of the equations in the set of equations has an adjustable parameter value to conform an output of the set of equations to data representing observed sediment erosion and deposition behavior, so that the set of equations accurately models sediment erosion and deposition behavior for sediment sizes throughout a range of about 10 microns to about 10 centimeters. A grain size distribution of an initial sediment bed condition is established. The set of equations is applied to the initial sediment bed condition. Outputs of the set of equations express how a moving fluid flow affects erosion and deposition of sediments. The grain size distribution of the initial sediment bed condition is adjusted based upon the outputs of the set of equations, to create a subsequent sediment bed condition having a grain size distribution associated therewith. The set of equations is re-applied to the subsequent sediment bed condition a pre-determined number of times. A model of the hydrocarbon reservoir is created using the subsequent sediment bed condition. The model of the hydrocarbon reservoir is outputted. A location to extract hydrocarbons from the hydrocarbon reservoir is predicted. Hydrocarbons are extracted from the hydrocarbon reservoir.

In another embodiment, the invention is a method of constructing a model of a hydrocarbon reservoir. Information is obtained relating to a fluid flow above a sediment bed made up of a plurality of sediment particles. A number i of bins is defined that classify the plurality of sediment particles according to size. For each of the bins, a dimensionless rate of re-suspension $E_{si}$ of sediment particles from the sediment bed into the flow field is calculated. The dimensionless rate of re-suspension $E_{si}$ is calculated according to $$E_{s_i} = \begin{cases} 0 & \text{if } Z_i \leq Z_c \\ \dfrac{a_z Z_i^{\omega-\varphi}(Z_i - Z_c)^{\varphi}}{1 + \dfrac{a_z}{e_m} Z_i^{\omega-\varphi}(Z_i - Z_c)^{\varphi}} & \text{if } Z_i > Z_c \end{cases}$$

where $a_z$ is equal to about $1.3 \times 10^{-7}$, $e_m$ is a maximum value of the dimensionless rate of re-suspension, $\omega$ is a major Z exponent, $\varphi$ is a non-zero minor Z component, $Z_c$ is a threshold value for initiation of re-suspension, and $Z_i$ is a variable having a value affected at least in part by the grain size of the sediment particles in the respective bin i. The model of the hydrocarbon reservoir is constructed using the dimensionless rate of re-suspension.

BRIEF DESCRIPTION OF THE DRAWINGS

The invention and its advantages may become apparent by reviewing the following detailed description and drawings of non-limiting examples of embodiments in which.

DETAILED DESCRIPTION OF PREFERRED EMBODIMENTS

Figure 1A:
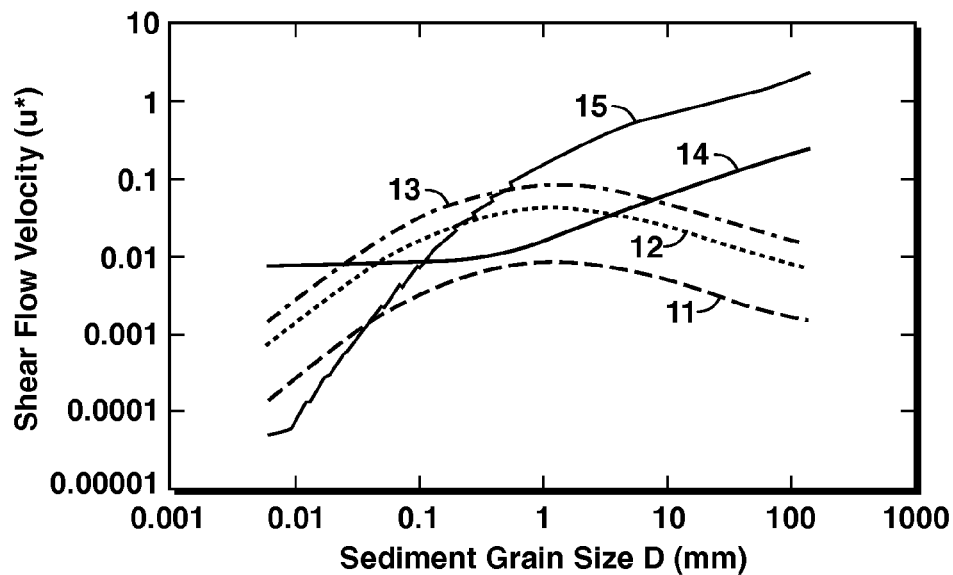
FIG. 1A is a graph showing curves predicting the onset of significant suspension obtained using known expressions.
Figure 1B:
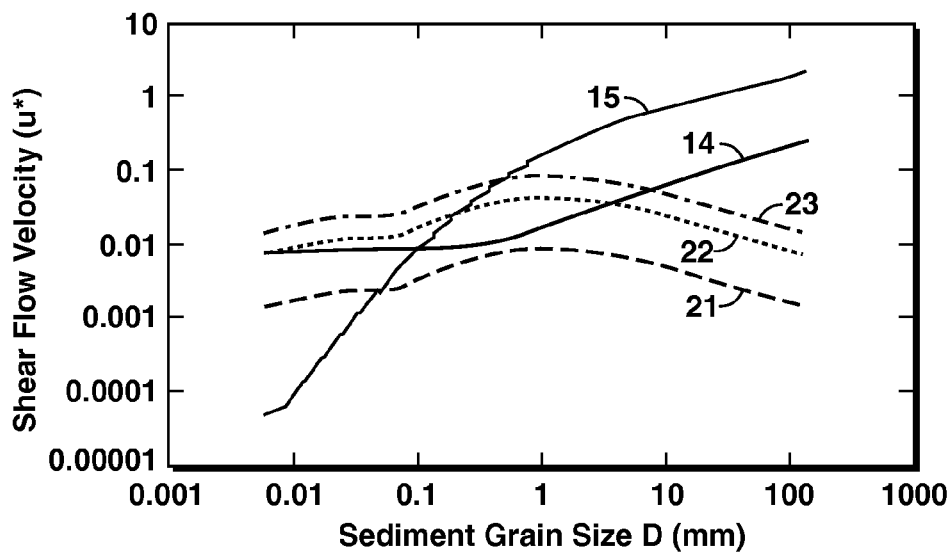
FIG. 1B is a graph showing curves predicting the onset of significant suspension obtained using other known expressions.

In this section specific embodiments of the invention are described. However, to the extent that the description is specific to a particular embodiment or a particular use of the invention, this is intended to be for illustrative purposes only and simply provides a description of the embodiments. Accordingly, the invention is not limited to the embodiments described below, but rather, the invention includes all alternatives, modifications, and equivalents falling within the spirit and scope of the appended claims.

Some portions of the detailed description which follows are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In this detailed description, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

Unless specifically stated otherwise as apparent from the following discussions, terms such as "evaluating", "adjusting", "defining", "applying", "re-applying", "re-adjusting", "outputting", "calculating", "establishing", "predicting", "constructing", "creating", "obtaining", "evaluating", "defining", or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. These and similar terms are to be associated with the appropriate physical quantities and are merely convenient labels applied to these quantities.

Embodiments of the invention also relate to an apparatus for performing the operations herein. This apparatus may be specially constructed for the required purposes, or it may comprise a general-purpose computer selectively activated or reconfigured by a computer program stored in the computer.

Such a computer program may be stored in a computer readable medium. A computer-readable medium includes any mechanism for storing or transmitting information in a form readable by a machine, such as a computer ('machine' and 'computer' are used synonymously herein). As a non-limiting example, a computer-readable medium may include a computer-readable storage medium (e.g., read only memory ("ROM"), random access memory ("RAM"), magnetic disk storage media, optical storage media, flash memory devices, etc.), and a computer-readable transmission medium (such as electrical, optical, acoustical or other form of propagated signals (e.g., carrier waves, infrared signals, digital signals, etc.)).

Furthermore, as will be apparent to one of ordinary skill in the relevant art, the modules, features, attributes, methodologies, and other aspects of the invention can be implemented as software, hardware, firmware or any combination thereof. Wherever a component of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the invention is not limited to implementation in any specific operating system or environment.

Aspects of the invention provide new models and expressions that overcome the deficiencies and inconsistencies previously discussed. The invention can be used in any theoretical or numerical models, 1D, 2D or 3D, to provide re-suspension (erosion) relationships, and the near bed to depth averaged sediment concentration ratio which are necessary for calculations of the transport, erosion and deposition of sediments in realistic settings. These theoretical and numerical models may then be used in, for example, reservoir architecture and property interpretations, geologic modeling of gas and oil reservoirs, and extracting hydrocarbons from a hydrocarbon reservoir.

To evaluate and calculate of the rate of re-suspension or entrainment of sediments of grain size bin i into the flow from the bed, the invention begins with the known relationship $$E_i = E_{si} v_{si} G_i \quad [15]$$

but calculates the dimensionless re-suspension rate $E_{si}$ as $$E_{si} = \begin{cases} 0 & \text{if } Z_i \leq Z_c \\ \dfrac{a_z Z_i^{\omega-\varphi}(Z_i - Z_c)^\varphi}{1 + \dfrac{a_z}{e_m} Z_i^{\omega-\varphi}(Z_i - Z_c)^\varphi} & \text{if } Z_i > Z_c. \end{cases} \quad [16]$$

In this equation, $a_z$ is a constant and typically has a value of $1.3 \times 10^{-7}$, and $e_m$ equals the maximum value of the dimensionless re-suspension rate $E_{si}$, as previously discussed with respect to Equation [2]. Furthermore, the exponent ω is termed the "major Z function exponent" and the exponent ϕ is termed the "minor Z function exponent". The values for ω may vary between 1 and 20, and the values for ϕ may vary between $0 < \varphi \leq 2$. In most cases a value between 4 and 5 can be used for ϕ, and the value of 5-ω can be used for ϕ.

Figure 4:
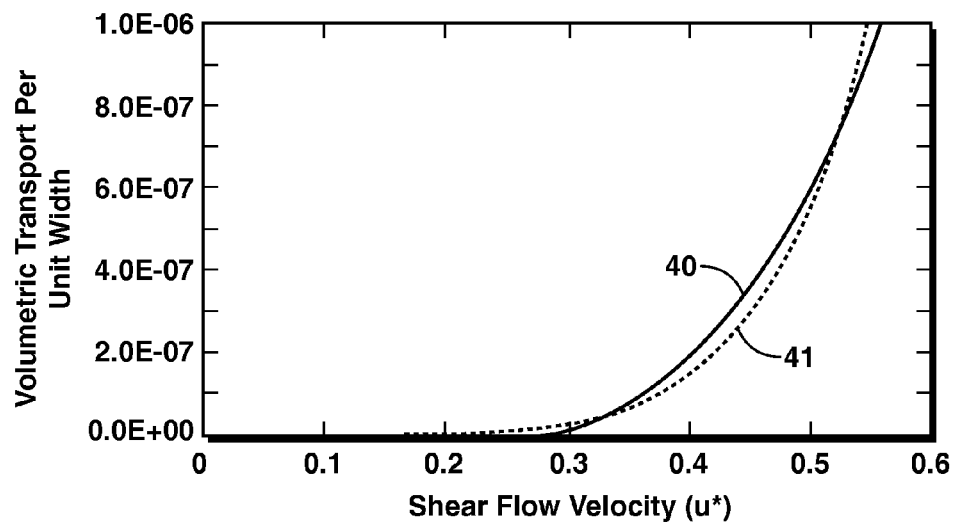
FIG. 4 is a graph compares the bed load transport and the suspended load transport according to known expressions.
Figure 5:
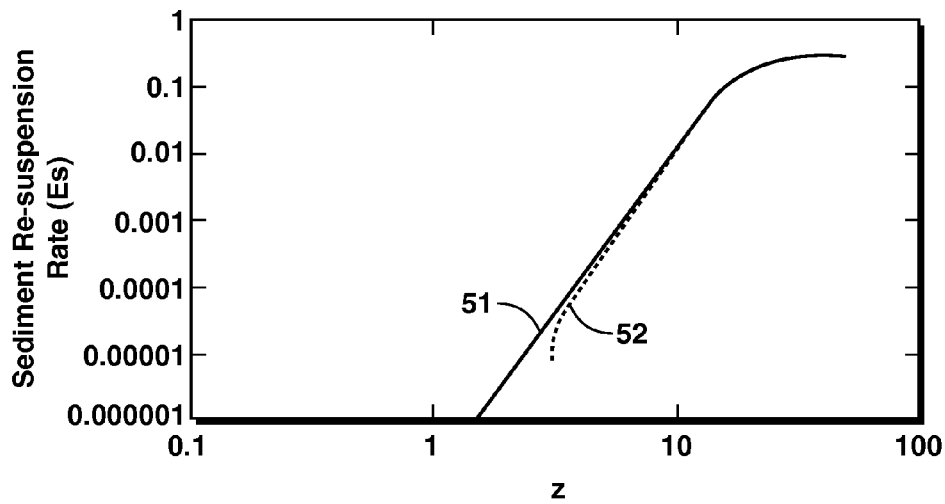
FIG. 5 is a graph comparing the dimensionless re-suspension rate as a function of Z, computed using the present invention and known expressions.
Figure 6:
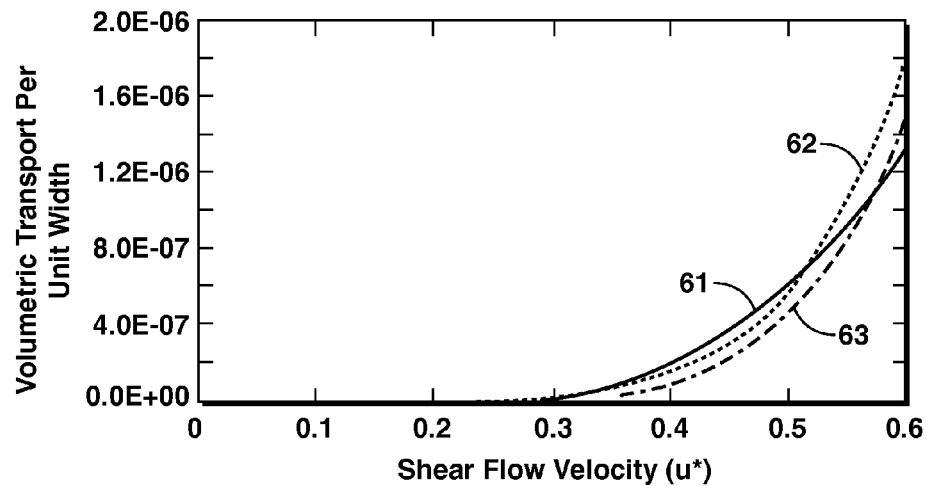
FIG. 6 is a graph comparing the bed load transport and the suspended load transport of sediments.

The method for evaluating the dimensionless re-suspension rate $E_{si}$ shown in Equation [16] includes a threshold value $Z_c$ for the initiation of re-suspension. FIG. 5 shows the comparison of the dimensionless re-suspension rate between curve 51 which was obtained from Equation [2], and curve 52 which was obtained from Equation [16]. The curve 52 for Equation [16] was calculated with parameters ω=4.8, ω=0.2 and $Z_c$=3.5. FIG. 5 shows that curve 52 deviates from curve 51 only when the value of Z drops to a level that is close to $Z_c$. The possibility of being able to incorporate a threshold for suspension is especially useful when the re-suspension function is used together with bed load transport functions, which often use a critical shear stress as the threshold for the onset of any sediment movement on the bed. Proper choice of $Z_c$ can eliminate the type of inconsistencies shown in FIG. 4 as previously discussed herein. FIG. 6 depicts the relationship of volumetric transport per unit width as a function of shear flow velocity. As with FIG. 4, the bed load transport case is represented by curve 61 and the suspended load calculated using Equation [2] is represented by curve 62. The suspended load calculated according to Equation [16] is represented by curve 63. It can be seen from the Figure that curve 63 remains below curve 61 when the shear force velocity u*<0.57. For u*<0.3 there is no bedload transport. When the shear force velocity u*>0.3 the bedload increases as u* increases. With the new re-suspension model as represented by curve 63, re-suspension does not occur until u* reaches the critical value of 0.35. Both the bed load and the suspended load increases as u* increases. The suspended load remains less than the bed load until u* reaches a value of 0.57. After that, the suspension load exceeds the bed load. This corrects the inconsistencies in the previous model, as seen in FIG. 6, where for u*<0.34 the curve 62 crosses above the curve 61, which incorrectly implies a transition from a bed load dominated transport to a suspended load dominated transport when the flow shear velocity u* is decreasing.

The variable $Z_i$ can be further defined, according to the invention, as $$Z_i = \lambda \frac{u^*}{v_{si}} f(R_{pi}) \left(\frac{D_i}{D_{50}}\right)^\upsilon \quad [17]$$

where, similar to Equation [3], λ is the correction function u* is the shear flow velocity, $v_{si}$ is the settling velocity for a sediment grain with diameter D in the i th size bin, $f(R_{pi})$ is the Reynolds function, and $D_{50}$ is the diameter of the sediment grain in the 50th percentile in the distribution. Additionally, υ is a hiding exponent that characterizes the strength of the corrections rising from the interactions among different size particles in a sediment mixture. While υ may be set at 0.2, other values are possible. The value of υ can be best determined by empirically fitting the model to known experimental data sets. In the absence of sufficient experimental data, the value of 0.2 can be used.

In Equation [17], $\lambda = \lambda(\sigma_\Phi)$ is a function that provides corrections to $Z_i$ for beds with sediments of mixed sizes. The invention is not limited to using the known function for λ as expressed in Equation [4]. A poorly sorted bed often results in a small value for λ because it has been observed that the re-suspension rate for sediment particles of a given size is often smaller if the sediments are from the bed with poorly sorted sediments, compared with from the bed with well sorted sediments. The invention may instead use the function $$\lambda = (1 - \lambda_\infty) e^{-\frac{\sigma_\Phi}{\sigma_{\Phi 0}}} + \lambda_\infty \quad [18]$$

where

-continued $$\sigma_{\Phi 0} = \frac{-\sigma_{\Phi_c}}{\ln\left(\frac{\lambda_c - \lambda_\infty}{1 - \lambda_\infty}\right)}. \quad [19]$$

In Equations [18] and [19], $\lambda_\infty$ is the asymptotic value of $\lambda$. It is the low limit of $\lambda$ for the worst sorting scenario. Experimental data suggest the possible range for $\lambda_\infty$ to be from 0 to 0.811. However, since there is only a limited amount of experimental data currently available, other values for $\lambda_\infty$ between 0.811 to a value that is less than 1 may be possible. In these equations $\sigma_{\Phi c}$ and $\lambda_c$ are model parameters, having values of 0.673 and 0.811 respectively, while other values are possible if suggested by experiments or field measurements observed for modern depositional systems, such as rivers, deltas, submarine channels, and the like.

Figure 7:
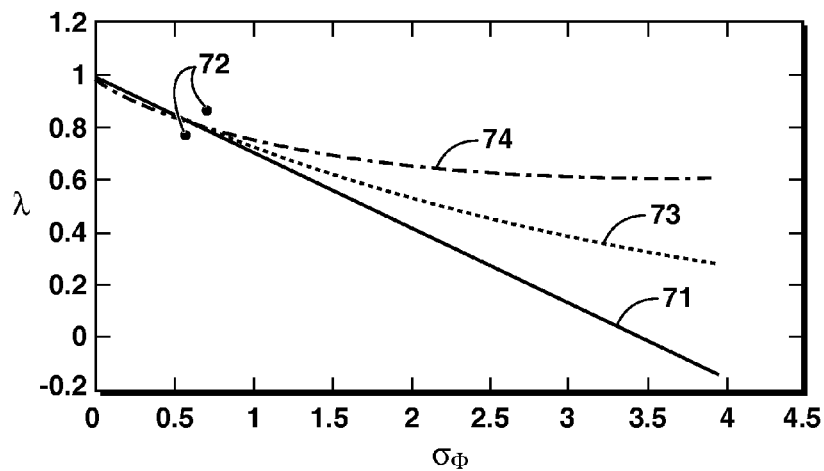
FIG. 7 is a graph comparing different A functions according to the invention.

FIG. 7 compares the relationship between $\lambda$ and $\sigma_\Phi$. Curve 71 is drawn according to Equation [4] and appears to comport with experimental data points 72. However, when $\sigma_\Phi$ is greater than 3.5, the value of $\lambda$ is negative, which is a physical impossibility. In contrast, using Equations [18] and [19] ensures a positive value for $\lambda$. This is seen in curve 73, which corresponds to $\lambda_\infty=0.25$, and curve 74, which corresponds to $\lambda_\infty=0.6$.

Another feature of the invention is the form of the Reynolds function $f(R_{pi})$ as used in Equations [3] and [17]. This new Reynolds function can be expressed as $$f(R_{pi}) = \begin{cases} \min(R_{pi}^\chi, \Xi_{Rp}) & \text{if } R_{pi} > R_{pc} \\ \dfrac{R_{pc}^\chi}{\ln\left[\left(\dfrac{R_{pc}}{R_{p0}}\right)^\gamma + 1\right]} \ln\left[\left(\dfrac{R_{pi}}{R_{p0}}\right)^\gamma + 1\right] & \text{if } R_{pi} \le R_{pc} \end{cases} \quad [20]$$

where $R_{pc}$ is the critical particle Reynolds number with a typical, but not essential, value of 2.36 (a value selected from the range of 1 to 10 is possible); $\Xi_{Rp}$ is the upper bound for $f(R_{pi})$ and has a value range of 1 to 30 (a value of 5 has been found to be suitable in a variety of instances); and $\chi$ is an exponent for which 0.6 has been found to be a suitable value (a value selected from the range of 0 to 1 is possible). In addition, $R_{p0}$ and $\gamma$ are two other model parameters. An example of a value found suitable for $R_{p0}$ is 1.13621, although values selected from the range of 0.1 to 10 are possible. An example of a value found suitable for $\gamma$ is 1.35, although values selected from the range of 0.1 to 10 are possible. The values for the exponents and variables disclosed herein have been derived through finding the best fit to experimental and field observations.

Figure 8:
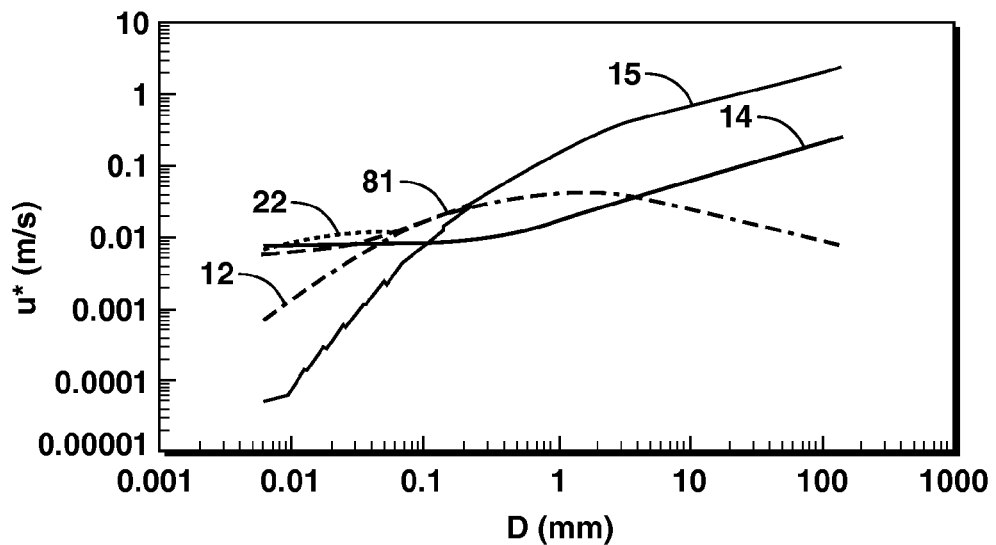
FIG. 8 is a graph comparing curves for the onset of significant suspensions from different models, including the invention.

FIG. 8 shows a curve 81 representing the onset of significant suspension according to the new re-suspension model described herein. Also depicted are curves 12, 22 calculated according to the previously discussed Garcia Thesis Model and Garcia 1993 Model, respectively. The curves shown in the Figure are all the curves with Z=5. It is clear from FIG. 8 that curve 81 increases monotonically as the particle size increases. The segment of curve 81 corresponding to the particles of small grain sizes (i.e., D<about 0.3 mm) has a concave shape. The part of curve 81 corresponding to larger large grain size particles no longer drops below the Shields curve 14, but instead closely follows the u*=$v_s$ curve 15. Therefore, the new re-suspension model disclosed herein solves many if not all the problems associated with the previous models discussed herein.

Figure 2:
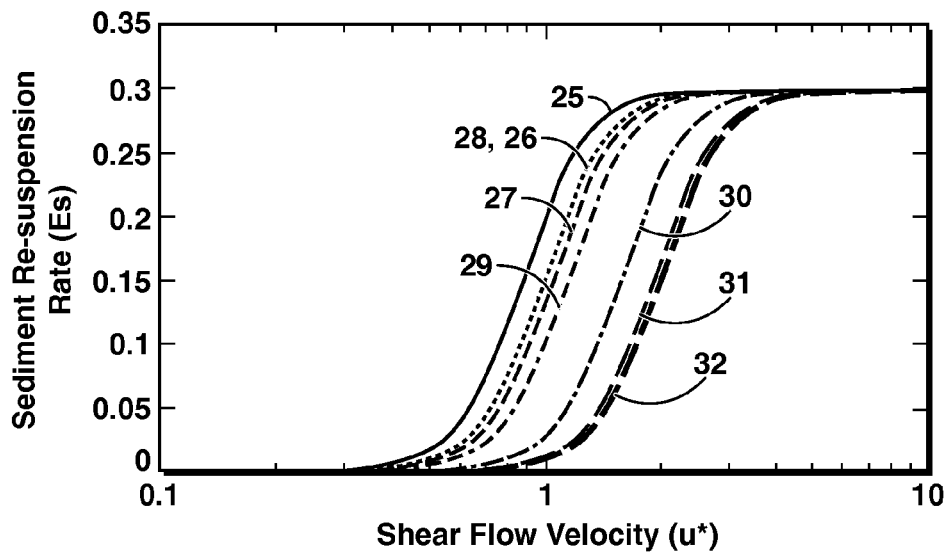
FIG. 2 is a graph showing the re-suspension rate for sediments of different grain sizes from a uniform mixture according to known expressions.
Figure 9:
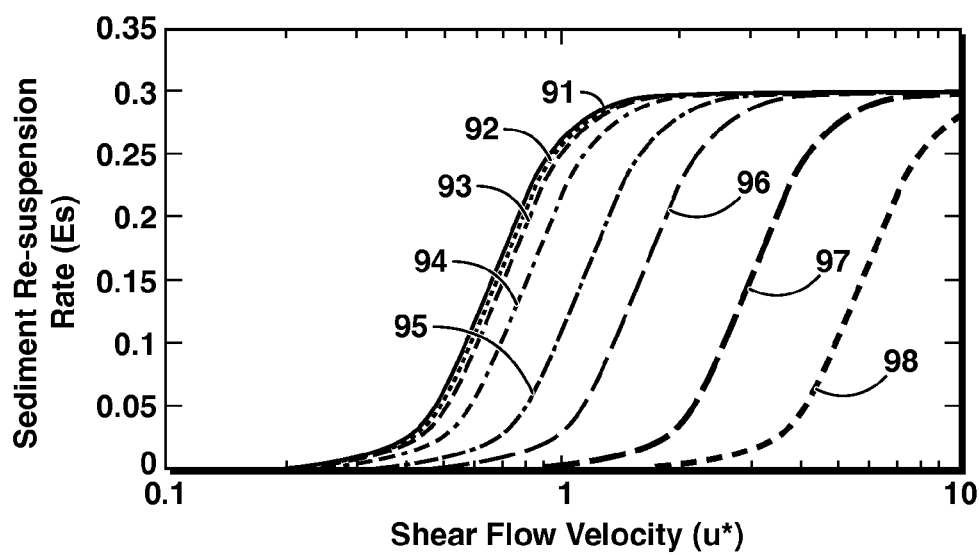
FIG. 9 is a graph showing the re-suspension rate for sediments of different grain sizes according to an embodiment of the invention.

To further demonstrate the improvement of the invention, FIG. 9 shows the dimensionless re-suspension rate $E_S$ plotted as a function of the shear flow velocity for different grain sizes in the mixture as follows: a grain size of 6.25 microns is shown by curve 91, a grain size of 12.5 microns is shown by curve 92, a grain size of 25 microns is shown by curve 93, a grain size of 50 microns is shown by curve 94, a grain size of 100 microns is shown by curve 95, a grain size of 200 microns is shown by curve 96, a grain size of 400 microns is shown by curve 97, and a grain size of 800 microns is shown by curve 98. The values in FIG. 9 are calculated using the re-suspension functions in Equations [17] and [20]. Comparing FIG. 9 to FIG. 2, it can be seen that the problem of reverse sorting is no longer present. In other words, the dimensionless re-suspension rate decreases without exception as grain size increases.

Figure 10:
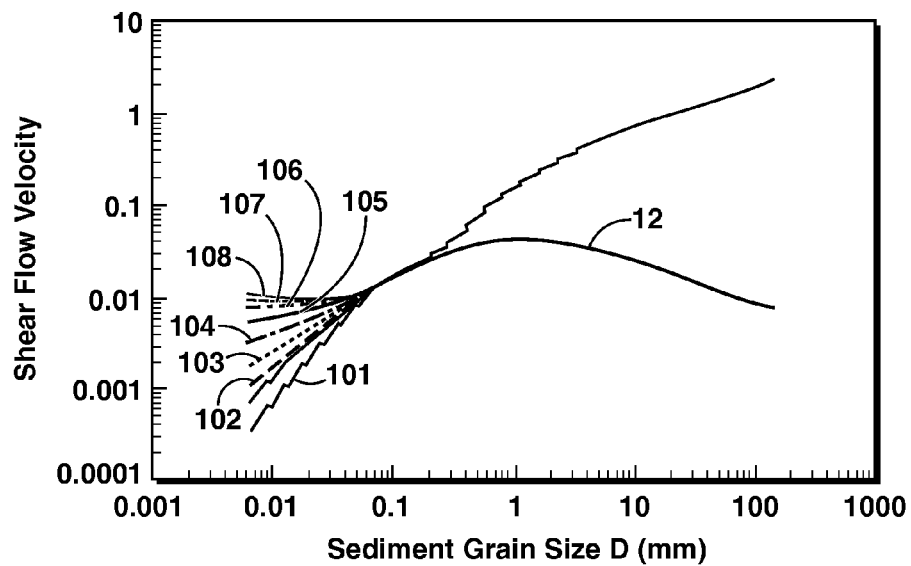
FIG. 10 is a graph showing how the curve representing the onset of significant suspension, generated using the re-suspension function of the invention, varies with different values of $\gamma$.

FIG. 10 shows the variation in values of shear flow velocity as a function of sediment grain size D, calculated using Equations [17]-[20] with Z=5, for different values of $\gamma$. Recall that the relationship between shear flow velocity and sediment grain size can be a predictor of the onset of re-suspension. Specifically, curve 101 represents $\gamma=0.5$, curve 102 represents $\gamma=0.85$, curve 103 represents $\gamma=1$, curve 104 represents $\gamma=1.2$, curve 105 represents $\gamma=1.35$, curve 106 represents $\gamma=1.45$, curve 107 represents $\gamma=1.5$, and curve 108 represents $\gamma=1.55$. The Garcia Thesis curve 12 is also shown for comparison. For sediments having a grain size greater than D≈0.6 mm, curves 101-108 overlap for all values of $\gamma$ tested. FIG. 10 shows that different values of $\gamma$ affect the re-suspension relationship in the regime of small grain sizes.

Figure 11:
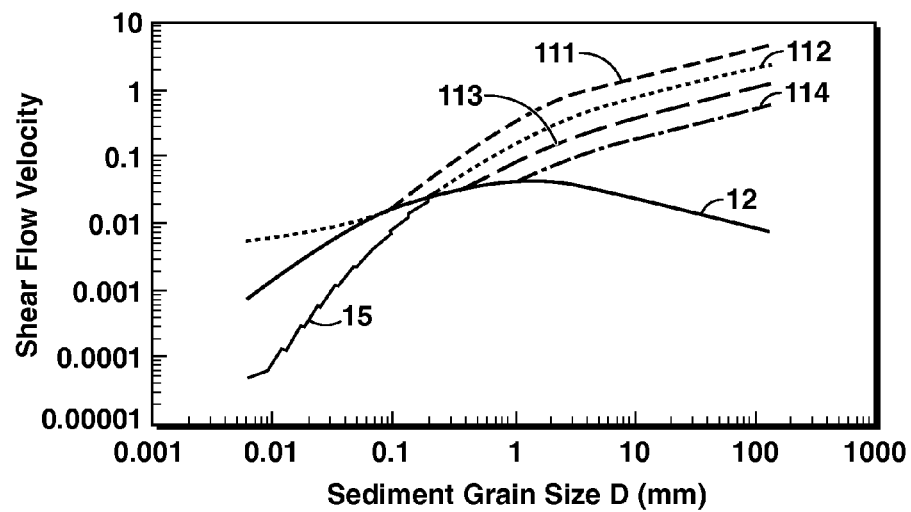
FIG. 11 is a graph showing how the curve representing the onset of significant suspension, generated using the re-suspension function of the invention, varies with different values of $\Xi_{Rp}$.

FIG. 11 shows variations of the onset of the significant re-suspension curve generated using Equations [17]-[20] with different choices of the parameter $\Xi_{Rp}$, which is the variable expressing the upper bound of the Reynolds function in Equation [20]. Specifically, the selected values of $\Xi_{Rp}=2.5$, 5, 10 and 20 are denoted by curves 111, 112, 113, and 114, respectively. Curve 12, generated using The Garcia Thesis Method, and curve 15, representing the function u*=$v_s$, are shown for comparison. Curves 111-114 overlap for small sediment grain sizes but begin to separate in the range 0.1<D<1. FIG. 11 shows that different values of the upper bound variable $\Xi_{Rp}$ affect the re-suspension relationship in the regime of large grain sizes.

The re-suspension function of Equation [16] may be used with a new method to evaluate the near bed to depth averaged sediment concentration ratio $r_0$. The new method may be expressed as $$r_0 = \frac{1 - \delta r_\infty}{1 - \delta}\left[\frac{1}{(\hat{u} + \delta) - \hat{u}e^{-\frac{(1-\delta)}{\hat{u}}}} + \frac{r_\infty - 1}{1 - \delta r_\infty}\right] \quad [21]$$

where $$\hat{u} = \left(\kappa \frac{u^*}{v_s}\right)^\theta. \quad [22]$$

Here, $\delta$ is the fraction of the flow depth at the point where the near bed concentration is defined. In most cases, a value of $\delta=0.05$ has been found to be suitable, although other values are also possible. In Equation [21], $r_\infty$ is the lower bound of $r_0$. In theory, $r_\infty$ should be 1. Empirically, a somewhat higher value of $r_\infty$ appears to give better results. Typical values for $r_\infty$ have been found to range between 1 and 2. In Equation [22], $\kappa$ and $\theta$ are model parameters. These parameters can be obtained by fitting the data to experiments in real-world applications. In most cases the value of κ can range from 0.1 to 1, and θ can range from 0.5 to 3, although other values are also possible.

Figure 3:
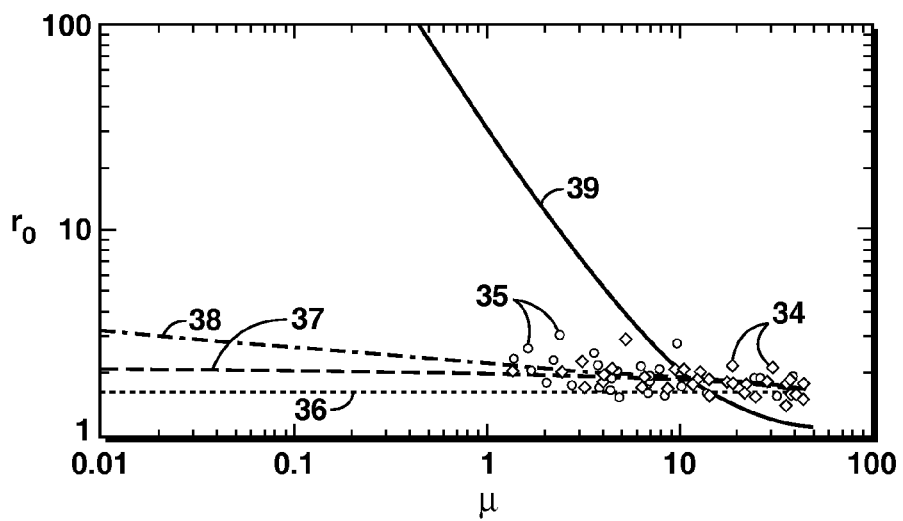
FIG. 3 is a graph showing the ratio between the near bed sediment concentration and the depth averaged concentration according to various known expressions therefor.
Figure 12:
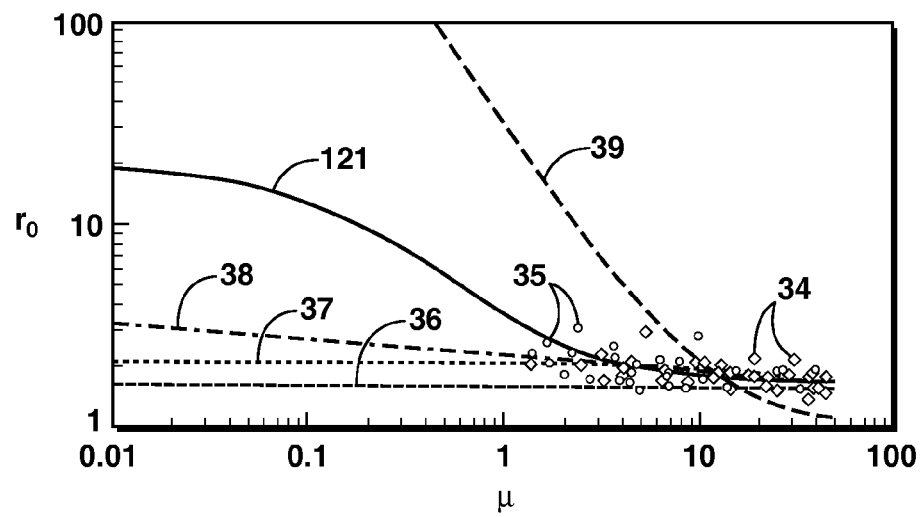
FIG. 12 is a graph comparing values for $r_0$ according to the invention with existing models.

FIG. 12 shows curve 121 generated according to Equations [21] and [22]. Other curves 36-39 were generated using existing models for $r_0$ as discussed with respect to FIG. 3. To calculate curve 121, $\delta=0.05$, $r_\infty=1.65$, $\kappa=0.3$, and $\theta=1$. It is clear from FIG. 12 that curve 121, generated using the model expressed in Equations [21] and [22], fits the available experimental data sets (indicated by diamonds 34 and circles 35) very well—and much better than the curves 36-39 representing existing models.

Figure 13:
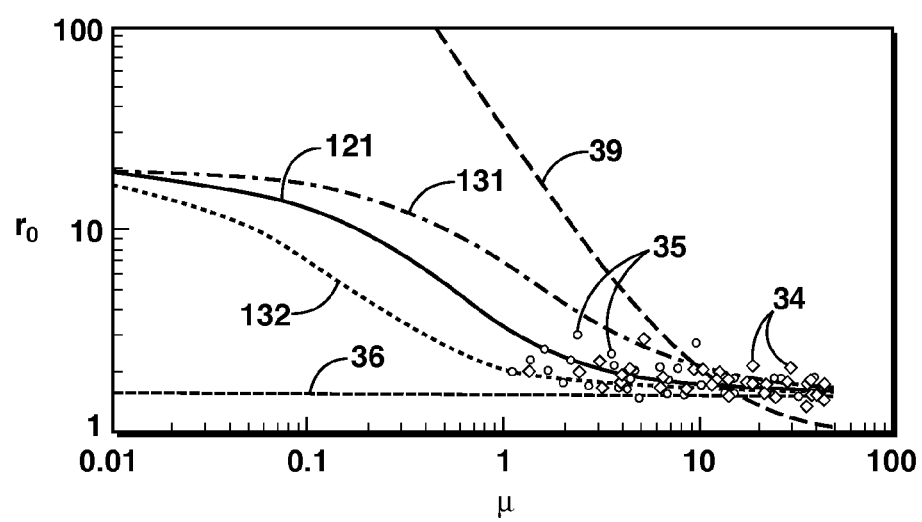
FIG. 13 is a graph showing how the value of $r_0$, generated according to the invention, varies with different values of $\kappa$.

FIG. 13 shows how variations in the model parameter κ modify the curve generated according to Equations [21] and [22]. Curve 121 is the same as curve 121 in FIG. 12, where $\kappa=0.3$. For curve 131, $\kappa=0.1$ and for curve 132, $\kappa=1.0$. Curves 36 and 39 represent outputs of existing models as previously explained. Once again, all values of κ shown in FIG. 13 provide a better fit to experimental data 34, 35 than the curves representing the existing models.

Figure 14:
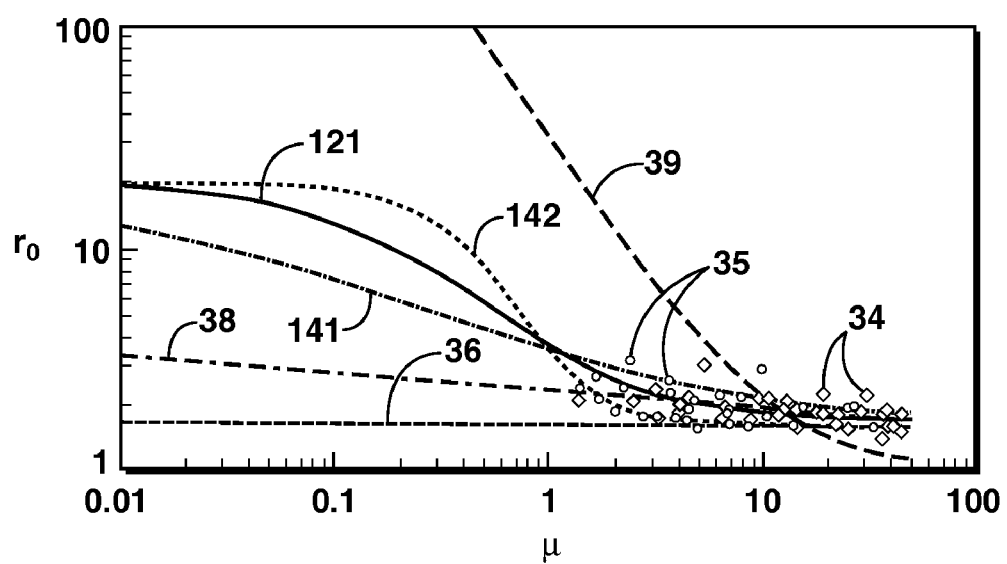
FIG. 14 is a graph showing how the value of $r_0$, generated according to the invention, varies with different values of $\theta$.

FIG. 14 shows how variations in the model parameter θ modify the curve generated according to Equations [21] and [22]. Curve 121 is the same as curve 121 in FIG. 12, where $\theta=1$. For curve 141, $\theta=0.5$ and for curve 142, $\theta=2.0$. Curves 36 and 39 represent outputs of existing models as previously explained. Once again, all values of θ shown in FIG. 14 provide a better fit to experimental data 34, 35 than the curves representing the existing models.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional blocks not shown herein. While the figures illustrate various actions occurring serially, it is to be appreciated that various actions could occur in series, substantially in parallel, and/or at substantially different points in time.

Figure 15:
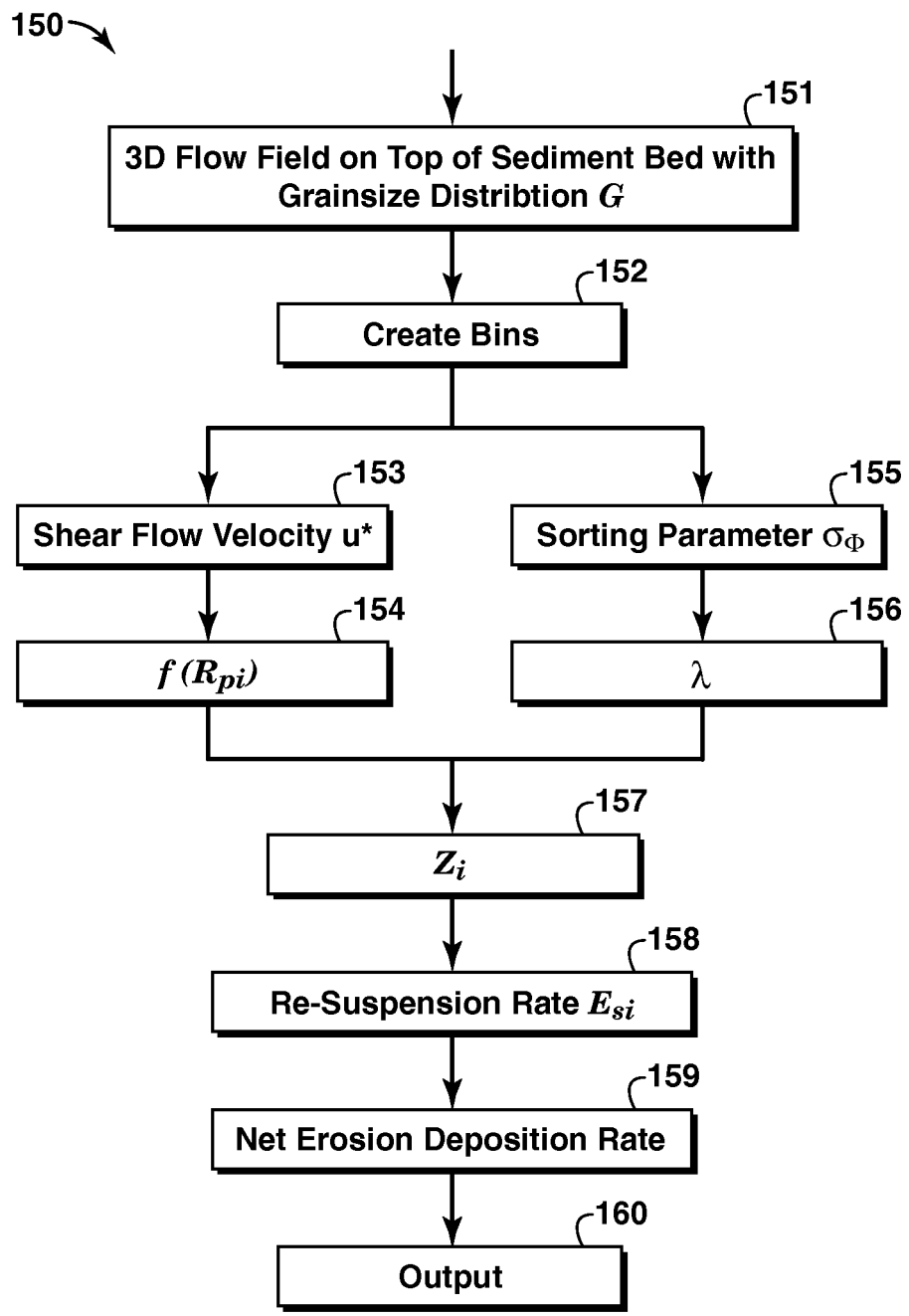
FIG. 15 is a flow chart showing a method according to an embodiment of the invention.

FIG. 15 is a flowchart showing a method 150 according to an embodiment of the invention. In block 151 information or data is received relating to a three-dimensional flow field on top of a sediment bed, where the sediment bed has a grain size distribution G. As previously explained in Equation [15], the re-suspension of sediments is a function of grain size. In block 152 the grain size distribution G is subdivided into a plurality of bins, where each bin represents a different grain size range within the grain size distribution G. In block 153 the shear flow velocity u* is computed using the known characteristics of the sediment particles (e.g. size and density) and the fluid (e.g. viscosity). At block 154 the Reynolds function $f(R_{pi})$ is computed for each bin. At block 155 the sorting parameter $\sigma_\Phi$ is computed for each bin. At step 156 the correction function λ is computed using the value of the sorting parameter computed at block 155.

Once λ and $f(R_{pi})$ are known, at block 157 the function $Z_i$ for each bin is computed. At block 158 the re-suspension rate $E_{si}$ is computed for each bin size. The net erosion deposition rate can then be determined, as represented at block 159. This information can then be output to a geologic model, which in one embodiment can be used to perform hydrocarbon reservoir performance simulations, select locations for new wells, estimate hydrocarbon reserves, plan reservoir development strategies, and conduct similar operations, all of which assist in extracting hydrocarbons from hydrocarbon reservoirs modeled thereby.

Figure 16:
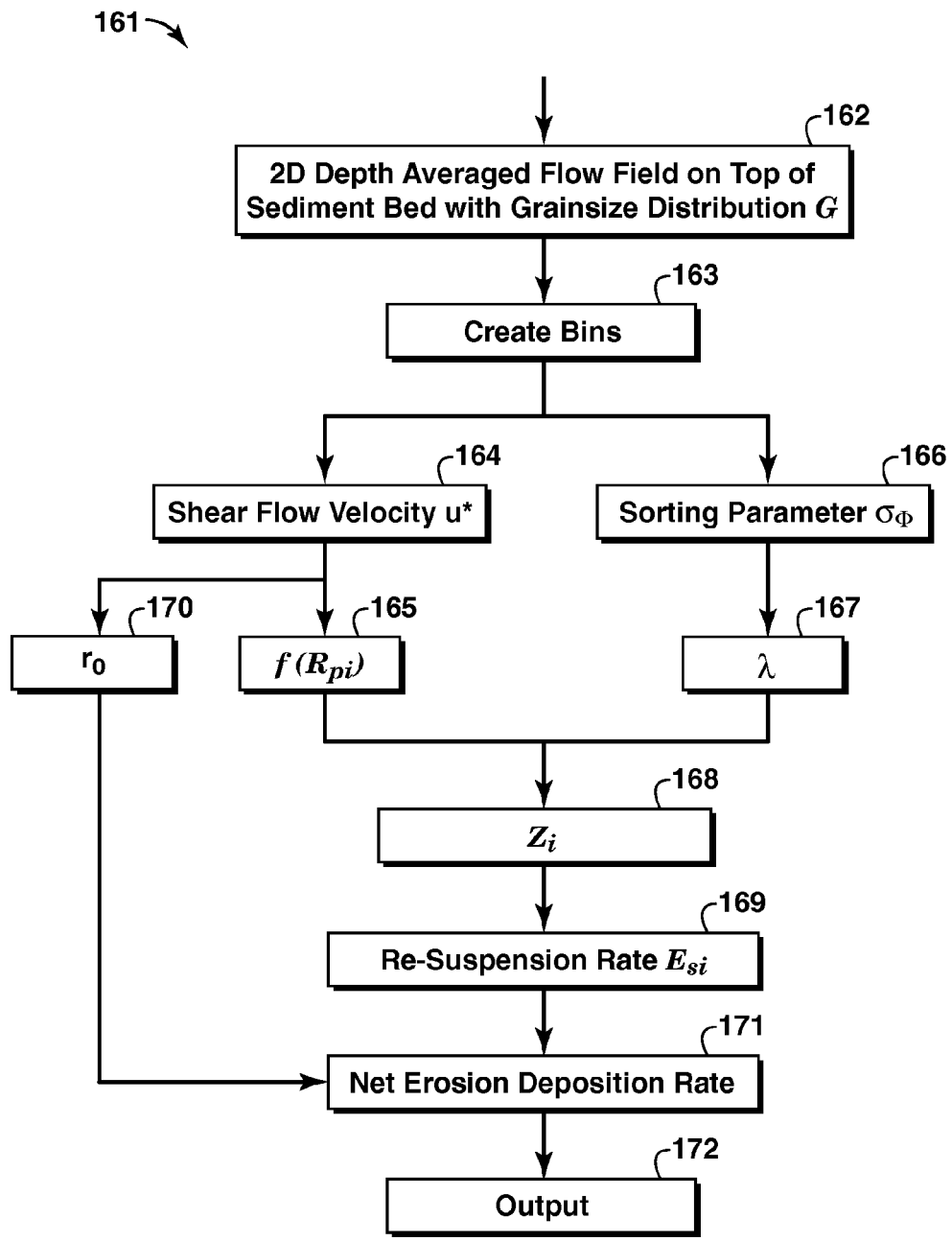
FIG. 16 is a flow chart showing a method according to another embodiment of the invention.

The invention may be used in situations where it is difficult or impossible to obtain information or data on a three-dimensional flow field. FIG. 16 is a flowchart showing a method 161 according to another embodiment of the invention. At block 162 information or data is received relating to a two-dimensional depth averaged flow field on top of a sediment bed, where the sediment bed has a grain size distribution G. At block 163 the grain size distribution G is subdivided into a plurality of bins, where each bin represents a different grain size range within the grain size distribution G. The computation or determination of u*, $f(R_{pi})$, $\sigma_\Phi$, λ, $Z_i$, and $E_{si}$ are then completed at blocks 164-169, respectively, as previously discussed herein. At block 170 the near bed to depth averaged sediment concentration ratio $r_0$ is determined. The net erosion deposition rate can then be calculated, as represented by block 171, and at block 172 the results are output to a geologic model, for example, as previously discussed. The geologic model can be used to determine the best methods to use to extract a hydrocarbon from a hydrocarbon reservoir that has been so modeled.

Figure 17:
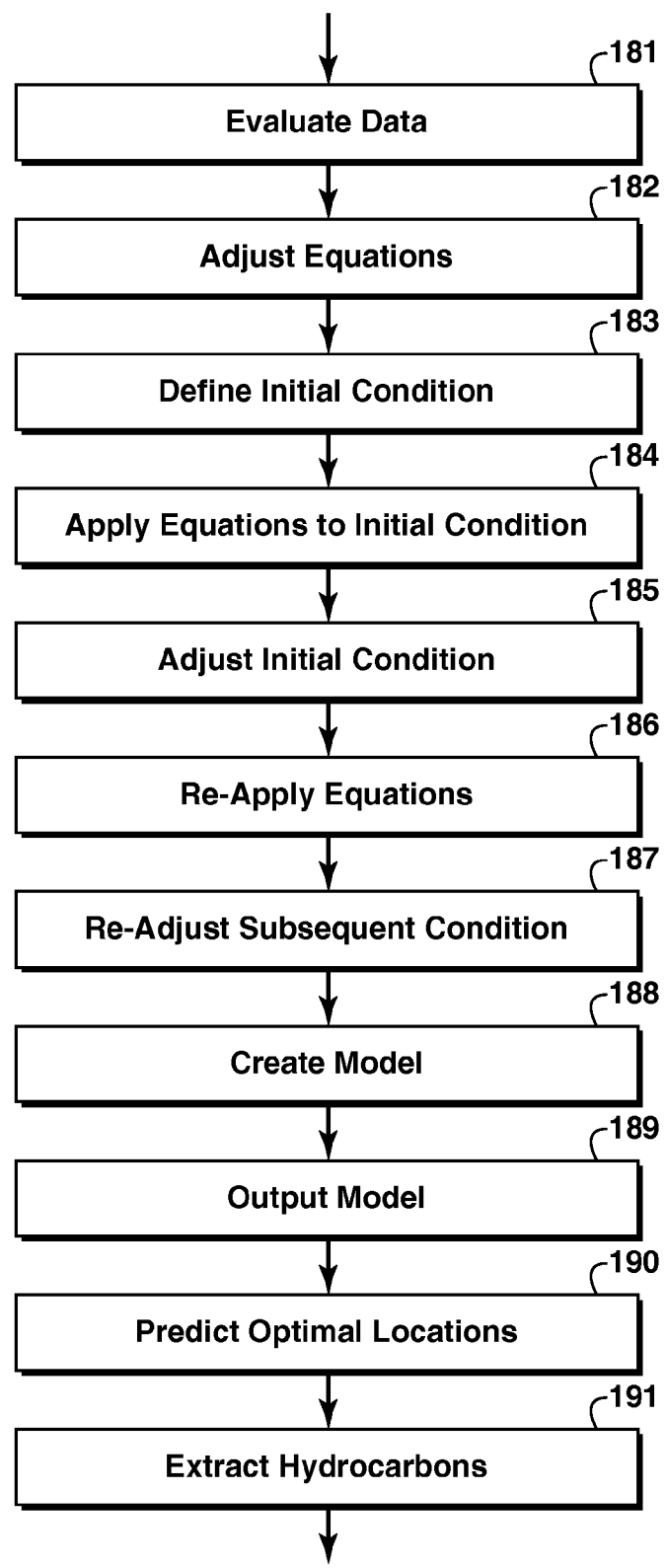
FIG. 17 is a flow chart showing other aspects of the invention.

FIG. 17 is a flowchart according to other aspects of the invention. At block 181 data representing observed sediment erosion and deposition behavior is evaluated. Such data may be taken from real-world observations or from controlled experiments. At block 182 a parameter in a set of equations is adjusted so that the output of the set of equations accurately matches the observed sediment erosion and deposition behavior for sediment sizes throughout a range of about 10 microns to about 10 centimeters. As previously discussed, except for the equations disclosed herein no known set of equations accurately matches observed sediment erosion and deposition behavior throughout the range of about 10 microns to about 10 centimeters. The set of equations includes one or more of Equations [16]-[22]. The parameter having its value adjusted may be one or more of ω, φ, $Z_c$, υ, $\lambda_\infty$, $\sigma_{\Phi c}$, $\lambda_c$, $R_{pc}$, $\Xi_{Rp}$, χ, $R_{p0}$, γ, $r_\infty$, κ, or θ as defined herein, or may be other parameters defined in Equations [16]-[22]. More than one parameter in the set of equations may be adjusted as necessary. At block 183 a grain size distribution of an initial condition of a sediment bed is defined. Such definition may include defining how variously sized sediments are initially deposited on and/or along the sediment bed. The initial condition may represent the present state of the sediment bed, or alternatively can represent the state of the sediment bed at some past time. At block 184 the set of equations with the adjusted parameter value is applied to the initial condition of the sediment bed. Outputs of the set of equations express how the fluid flow affects the erosion and deposition of sediments at the initial condition of the sediment bed. At block 185 the grain size distribution of the initial condition of the sediment bed is adjusted based on the outputs of the set of equations, and a subsequent sediment bed condition is thereby created. The subsequent sediment bed has a grain size distribution associated therewith that expresses how sediment is deposited on and/or along the sediment bed after the fluid flow has interacted with the sediment for a given time period. Depending on many variables and parameters such as sediment size and flow velocity, the fluid flow will erode some of the sediment and re-deposit some of the sediment at various places along the sediment bed. As subsurface reservoirs such as hydrocarbon reservoirs are normally formed over a period of thousands or millions of years, a single application of the set of equations to the sediment bed conditions may not accurately predict hydrocarbon reservoir formation. Therefore, if deemed necessary, at block 186 the set of equations with the adjusted parameter value is re-applied to the subsequent sediment bed condition for a predetermined number of times. The predetermined number of times is chosen to approximate the conditions of the hydrocarbon reservoir, based on an estimated reservoir formation time. Therefore, the predetermined number may be any number, but is typically on the order of thousands, millions, or even tens of millions. At block 187 the grain size distribution of the subsequent sediment bed condition is re-adjusted after each re-application of the set of equations with the adjusted parameter value. After the subsequent sediment bed condition has been re-adjusted the predetermined number of times, the sediment bed condition may predict how sediments have been deposited in a hydrocarbon reservoir, and at block 188 a model of the hydrocarbon reservoir may be constructed or created therewith. The reservoir model may provide information as to the current location of differently sized sediments in the reservoir and may therefore accurately predict permeability, and/or other factors affecting hydrocarbon extraction, at various locations in the reservoir. At block 189 the reservoir model is outputted to a display, a computer printout, or a computer storage medium. At block 190 the reservoir model may be used to predict optimal locations to extract hydrocarbons from the reservoir. At block 191 hydrocarbons are extracted from the hydrocarbon reservoir using known hydrocarbon extraction techniques.

The invention as described herein has provided equations, expressions, and relationships relating to sediment flow and re-suspension, for example, Equations [16]-[22]. These equations may be used in any combination with known expressions and concepts, such as Equations [1]-[14], to predict sediment behavior or to best fit empirical data for a given scenario. For example, referring to FIG. 15, the Reynolds function $f(R_{pi})$ (block 154) and the correction function $\lambda$ (block 156) may be calculated using Equations [20] and [18]-[19], respectively, while $Z_i$ (block 157) and the re-suspension rate $E_{si}$ (block 158) may be calculated using previously known Equations [3] and [2], respectively. Likewise, any other combination of known and inventive concepts is within the scope of the invention. Furthermore, many parameters and variables have been defined herein having values determined by evaluating the results of experiments or of observed sediment/flow behavior. The values of the parameters and variables as disclosed herein can be varied to correspond or fit to additional experimental data sets. Such variations in the parameter/variable values are considered to be within the scope of the invention.

Figure 18:
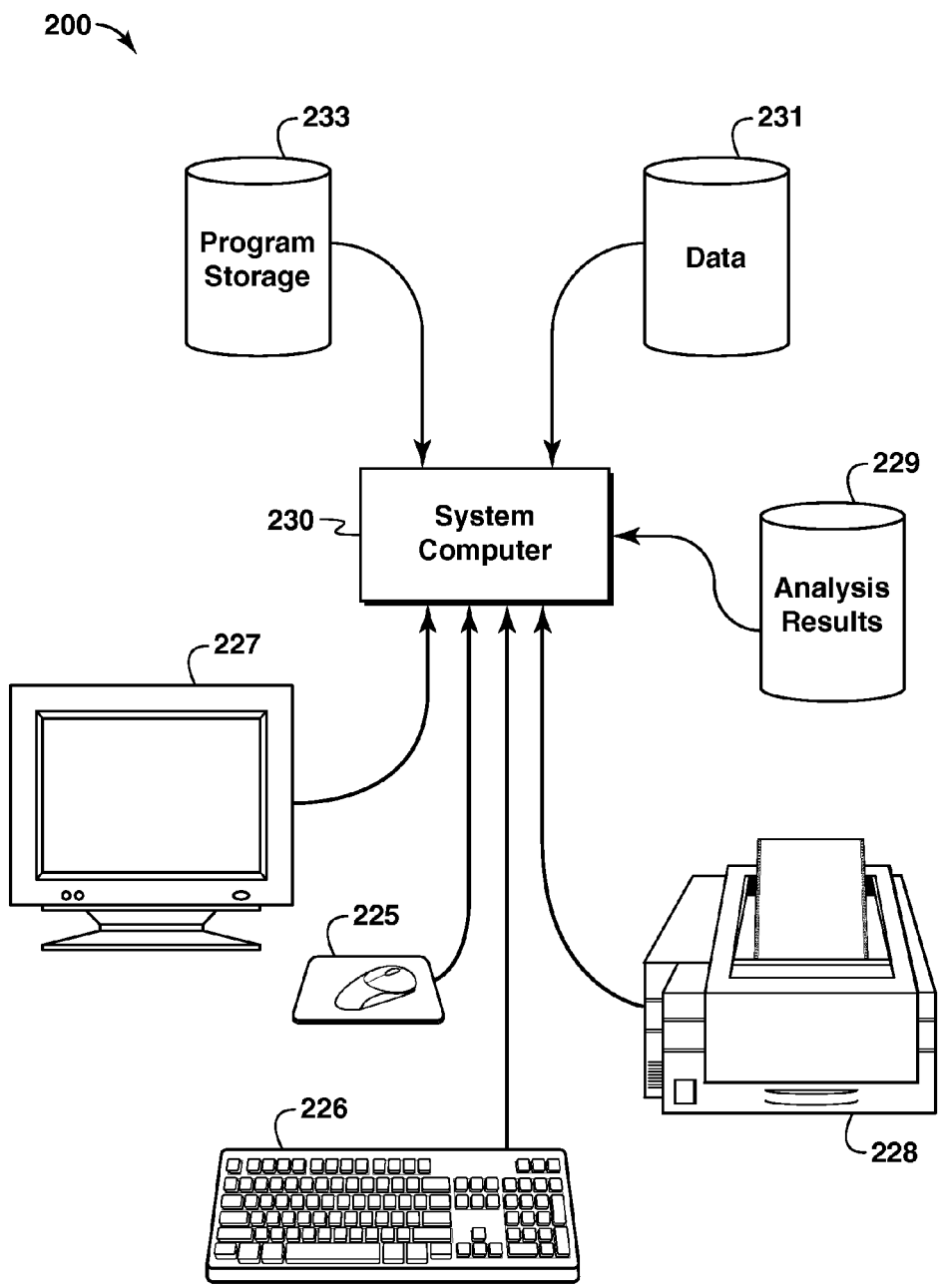
FIG. 18 is a block diagram showing a computer system according to the invention.

FIG. 18 depicts a block diagram of a computing environment 200 that may implement one or more of the disclosed methods according to the invention. Computing environment 200 includes a system computer 230, which may be implemented as any conventional personal computer or workstation, such as a UNIX-based workstation. The system computer 230 is in communication with disk storage devices 229, 231, and 233, each of which may be any known type of computer-readable storage media such as external hard disk storage devices that are either directly connected to the system computer or accessed using a local area network or by remote access. Although disk storage devices 229, 231, and 233 are illustrated as separate devices, a single disk storage device may be used to store any and all of the program instructions, measurement data, and results as desired.

In one embodiment, the input data are stored in disk storage device 231. The system computer 230 may retrieve the appropriate data from the disk storage device 231 to perform the reservoir evaluation and model creation according to program instructions that correspond to the methods described herein. The program instructions may be written in a computer programming language, such as C++, Java and the like. The program instructions may be stored in a computer-readable memory, such as program disk storage device 233. System computer 230 presents output primarily onto a graphics display 227, or alternatively to a printer 228. The system computer 230 may store the results of the methods described above on disk storage 229, for later use and further analysis. The keyboard 226 and the pointing device (e.g., a mouse, trackball, or the like) 225 may be provided with the system computer 230 to enable interactive operation. The system computer 230 may be located at a data center remote from the reservoir. Additionally, while the description above is in the context of computer-executable instructions that may run on one or more computers, those skilled in the art will recognize that the subject matter as claimed also can be implemented in combination with other program modules and/or as a combination of hardware and software.

The embodiments of the invention discussed herein are only examples of the invention, it being understood that the invention may be susceptible to various modifications and alternative forms. It is not intended for the invention to be limited to the disclosed embodiments. Indeed, the invention includes all alternatives, modifications, and equivalents falling within the spirit and scope of the claims.

What is claimed is:

1. A method comprising:

evaluating data representing observed sediment erosion and deposition behavior in a hydrocarbon reservoir;

adjusting a parameter value in a set of equations so that the output of the set of equations accurately matches the observed sediment erosion and deposition behavior for sediment sizes throughout a range of about 10 microns to about 10 centimeters, wherein the set of equations includes an equation representing a dimensionless rate of re-suspension of sediments from the sediment bed into the fluid flow, wherein the dimensionless rate of re-suspension for each of i size-defined sediment bins is calculated according to $$E_{s_i} = \begin{cases} 0 & \text{if } Z_i \leq Z_c \\ \dfrac{a_z Z_i^{\omega-\varphi}(Z_i - Z_c)^{\varphi}}{1 + \dfrac{a_z}{e_m} Z_i^{\omega-\varphi}(Z_i - Z_c)^{\varphi}} & \text{if } Z_i > Z_c \end{cases}$$

where $a_z$ is equal to about $1.3 \times 10^{-7}$, $e_m$ is a maximum value of the dimensionless rate of re-suspension, $\omega$ is a major Z exponent having a value selected from a range of 1 and 20, $\varphi$ is a non-zero minor Z component having a value of $5-\omega$, $Z_c$ is a threshold value for initiation of re-suspension, and $Z_i$ is a variable having a value affected at least in part by the grain size of sediment particles in the respective bin i;

defining a grain size distribution of an initial condition of a sediment bed in the hydrocarbon reservoir;

applying the set of equations with the adjusted parameter value to the initial condition of the sediment bed, wherein outputs of the set of equations express how a fluid flow affects the erosion and deposition of sediments at the initial condition of the sediment bed;

adjusting the grain size distribution of the initial condition of the sediment bed based on the outputs of the set of equations, to create a subsequent sediment bed condition having a grain size distribution associated therewith;

re-applying the set of equations with the adjusted parameter value to the subsequent sediment bed condition a pre-determined number of times;

re-adjusting the grain size distribution of the subsequent sediment bed condition after each re-application of the set of equations with the adjusted parameter value;

creating a model of the hydrocarbon reservoir using the subsequent sediment bed condition; and outputting the model of the hydrocarbon reservoir.

2. The method of claim 1, wherein $\omega$ has a value selected from a range of about 4 and about 5.

3. The method of claim 1, wherein $\phi$ has a value of less than 2.

4. The method of claim 1, wherein the value of $Z_i$ is calculated according to $$Z_i = \lambda \frac{u^*}{v_{si}} f(R_{pi}) \left(\frac{D_i}{D_{50}}\right)^\upsilon$$

where $\lambda$, is a correction function, $u^*$ is a shear force velocity, $D_i$ is a diameter of sediment grains in the i th bin, $v_{si}$ is a settling velocity for a sediment grain with diameter $D_i$, $f(R_{pi})$ is a Reynolds function for sediment grains in the ith bin, $D_{50}$ is a diameter of a sediment grain in a 50th percentile in the grain size distribution, and $\upsilon$ is an exponent characterizing strength of corrections rising from interactions among different size particles in the plurality of sediment particles.

5. The method of claim 4, wherein $\upsilon$ has a value that is not equal to 0.2.

6. The method of claim 4, wherein the correction function $\lambda$ is calculated according to $$\lambda = (1-\lambda_\infty)e^{-\frac{\sigma_\Phi}{\sigma_{\Phi 0}}} + \lambda_\infty$$

where $\lambda_\infty$ is a low limit of the correction function $\lambda$, $\sigma_\Phi$ is a standard deviation of grain size distribution, and $v_{\Phi 0}$ is calculated according to $$\sigma_{\Phi 0} = \frac{-\sigma_{\Phi c}}{\ln\left(\frac{\lambda_c - \lambda_\infty}{1-\lambda_\infty}\right)}$$

where $\sigma_{\Phi c}$ and $\lambda_c$ are numeric variables.

7. The method of claim 6, wherein $\lambda_\infty$ has a value in the range of about 0 to about 0.811.

8. The method of claim 6, wherein a, has $\sigma_{\Phi c}$ value of about 0.673.

9. The method of claim 6, wherein $\lambda_c$ has a value of about 0.811.

10. The method of claim 5, wherein the Reynolds function is calculated according to $$f(R_{pi}) = \begin{cases} \min(R_{pi}^\chi, \Xi_{Rp}) & \text{if } R_{pi} > R_{pc} \\ \frac{R_{pc}^\chi}{\ln\left[\left(\frac{R_{pc}}{R_{p0}}\right)^\gamma + 1\right]} \ln\left[\left(\frac{R_{pi}}{R_{p0}}\right)^\gamma + 1\right] & \text{if } R_{pi} \leq R_{pc} \end{cases}$$

where $R_{pc}$ is a critical particle Reynolds number having a value selected from a range of 1 and 10, $\Xi_{Rp}$ is an upper bound for the Reynolds function having a value selected from a range of 1 to 30, $\chi$ is an exponent having a value selected from a range of 0 and 1, $R_{p0}$ is a parameter having a value selected from a range of 0.1 and 10, and $\gamma$ is an exponent having a value selected from a range of 0.1 and 10.

11. The method of claim 10, wherein $\chi$ has a value of about 0.6.

12. The method of claim 10, wherein $\gamma$ has a value of about 1.35.

13. The method of claim 10, wherein $\Xi_{Rp}$ has a value of about 5.

14. The method of claim 1, wherein the set of equations includes an equation expressing a ratio $r_0$ between a near bed sediment concentration and a depth averaged sediment concentration, wherein the ratio is evaluated according to $$r_0 = \frac{1-\delta r_\infty}{1-\delta}\left[\frac{1}{(\hat{u}+\delta)-\hat{u}e^{-\frac{(1-\delta)}{\hat{u}}}} + \frac{r_\infty - 1}{1-\delta r_\infty}\right]$$

where $\delta$ is a fraction of a flow depth at a point where the near bed concentration is defined, $r_\infty$ is a lower bound of $r_0$, and $\hat{u}$ is calculated according to $$\hat{u} = \left(\kappa \frac{u^*}{v_s}\right)^\theta$$

where $\kappa$ and $\theta$ are model parameters and $v_s$ is the settling velocity for the sediment in the near bed sediment region.

15. The method of claim 14, wherein $\delta$ has a value of about 0.05.

16. The method of claim 14, wherein $r_\infty$ has a value of between about 1 and about 2.

17. The method of claim 14, wherein $\kappa$ has a value of between about 0.1 to about 1.

18. The method of claim 14, wherein $\theta$ has a value of between about 0.5 to about 3.

19. A method of extracting hydrocarbons from a hydrocarbon reservoir, comprising:

defining a set of equations relating to sediment erosion and deposition, at least one of the equations in the set of equations having an adjustable parameter value to conform an output of the set of equations to data representing observed sediment erosion and deposition behavior, so that the set of equations accurately models sediment erosion and deposition behavior for sediment sizes throughout a range of about 10 microns to about 10 centimeters, wherein the set of equations includes an equation representing a dimensionless rate of re-suspension of sediments from the sediment bed into the fluid flow, wherein the dimensionless rate of re-suspension for each of i size-defined sediment bins is calculated according to $$E_{s_i} = \begin{cases} 0 & \text{if } Z_i \le Z_c \\ \dfrac{a_z Z_i^{\omega-\varphi}(Z_i - Z_c)^{\varphi}}{1 + \dfrac{a_z}{e_m} Z_i^{\omega-\varphi}(Z_i - Z_c)^{\varphi}} & \text{if } Z_i > Z_c \end{cases}$$

where $a_z$ is equal to about $1.3 \times 10^{-7}$, $e_m$ is a maximum value of the dimensionless rate of re-suspension, $\omega$ is a major Z exponent having a value selected from a range of 1 and 20, $\varphi$ is a non-zero minor Z component having a value of $5-\omega$, $Z_c$ is a threshold value for initiation of re-suspension, and $Z_i$ is a variable having a value affected at least in part by the grain size of sediment particles in the respective bin i;

establishing a grain size distribution of an initial sediment bed condition;

applying the set of equations to the initial sediment bed condition, wherein outputs of the set of equations express how a moving fluid flow affects erosion and deposition of sediments;

adjusting the grain size distribution of the initial sediment bed condition based upon the outputs of the set of equations, to create a subsequent sediment bed condition having a grain size distribution associated therewith;

re-applying the set of equations to the subsequent sediment bed condition a pre-determined number of times;

creating a model of the hydrocarbon reservoir using the subsequent sediment bed condition;

outputting the model of the hydrocarbon reservoir;

predicting a location to extract hydrocarbons from the hydrocarbon reservoir; and extracting hydrocarbons from the hydrocarbon reservoir.

20. A method comprising:

obtaining information relating to a fluid flow above a sediment bed made up of a plurality of sediment particles;

defining a number i of bins that classify the plurality of sediment particles according to size;

for each of the bins, calculating a dimensionless rate of re-suspension $E_{s_i}$ of sediment particles from the sediment bed into the flow field according to $$E_{s_i} = \begin{cases} 0 & \text{if } Z_i \le Z_c \\ \dfrac{a_z Z_i^{\omega-\varphi}(Z_i - Z_c)^{\varphi}}{1 + \dfrac{a_z}{e_m} Z_i^{\omega-\varphi}(Z_i - Z_c)^{\varphi}} & \text{if } Z_i > Z_c \end{cases}$$

where $a_z$ is equal to about $1.3 \times 10^{-7}$, $e_m$ is a maximum value of the dimensionless rate of re-suspension, $\omega$ is a major Z exponent, $\varphi$ is a non-zero minor Z component, $Z_c$ is a threshold value for initiation of re-suspension, and $Z_i$ is a variable having a value affected at least in part by the grain size of the sediment particles in the respective bin i; and constructing the model of the sediment bed using the dimensionless rate of re-suspension.

21. A computer program product having computer executable logic recorded on a tangible non-transitory computer readable medium, the computer program product comprising:

code for evaluating data representing observed sediment erosion and deposition behavior in a hydrocarbon reservoir;

code for adjusting a parameter value in a set of equations so that the output of the set of equations accurately matches the observed sediment erosion and deposition behavior for sediment sizes throughout a range of about 10 microns to about 10 centimeters, wherein the set of equations includes an equation representing a dimensionless rate of re-suspension of sediments from the sediment bed into the fluid flow, wherein the dimensionless rate of re-suspension for each of i size-defined sediment bins is calculated according to $$E_{s_i} = \begin{cases} 0 & \text{if } Z_i \le Z_c \\ \dfrac{a_z Z_i^{\omega-\varphi}(Z_i - Z_c)^{\varphi}}{1 + \dfrac{a_z}{e_m} Z_i^{\omega-\varphi}(Z_i - Z_c)^{\varphi}} & \text{if } Z_i > Z_c \end{cases}$$

where $a_z$ is equal to about $1.3 \times 10^{-7}$, $e_m$ is a maximum value of the dimensionless rate of re-suspension, $\omega$ is a major Z exponent having a value selected from a range of 1 and 20, $\varphi$ is a non-zero minor Z component having a value of $5-\omega$, $Z_c$ is a threshold value for initiation of re-suspension, and $Z_i$ is a variable having a value affected at least in part by the grain size of sediment particles in the respective bin i;

code for defining a grain size distribution of an initial condition of a sediment bed in the hydrocarbon reservoir;

code for applying the set of equations with the adjusted parameter value to the initial condition of the sediment bed, wherein outputs of the set of equations express how a fluid flow affects the erosion and deposition of sediments at the initial condition of the sediment bed;

code for adjusting the grain size distribution of the initial condition of the sediment bed based on the outputs of the set of equations, to create a subsequent sediment bed condition having a grain size distribution associated therewith;

code for re-applying the set of equations with the adjusted parameter value to the subsequent sediment bed condition a pre-determined number of times;

code for re-adjusting the grain size distribution of the subsequent sediment bed condition after each re-application of the set of equations with the adjusted parameter value; and code for creating a model of the hydrocarbon reservoir using the subsequent sediment bed condition.

* * * * *